(Model.)

C. STENGEL.
FURNITURE CASTER.

No. 277,954. Patented May 22, 1883.

WITNESSES:
John R. Woods.
John Lorenz

Charles Stengel INVENTOR
by James N. See
ATTORNEY

N. PETERS, Photo-Lithographer, Washington, D. C.

UNITED STATES PATENT OFFICE.

CHARLES STENGEL, OF HAMILTON, OHIO.

FURNITURE-CASTER.

SPECIFICATION forming part of Letters Patent No. 277,954, dated May 22, 1883.

Application filed December 26, 1882. (Model.)

*To all whom it may concern:*

Be it known that I, CHARLES STENGEL, of Hamilton, Butler county, Ohio, have invented certain new and useful Improvements in Casters, of which the following is a specification.

This invention relates to devices for securing the casting forming the housing of a caster to the spindle, and to devices for securing freedom in the oscillation of the housing upon the spindle. By "oscillation" is meant the movement of the housing upon a horizontal axis, whereby two floor-wheels in a single caster may have an equal bearing upon the floor, and by "swiveling" is meant the motion of the housing upon a vertical axis to suit the direction of travel.

Figure 1:
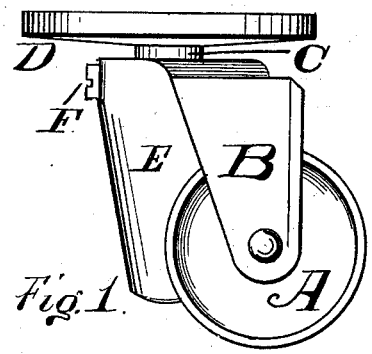
Figure 2:
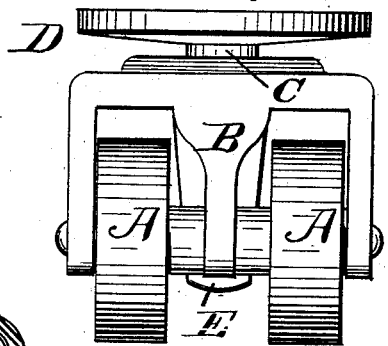
Figure 3:
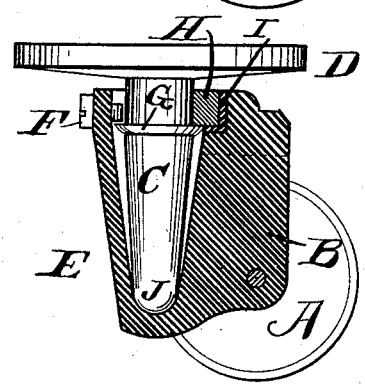
Figure 7:
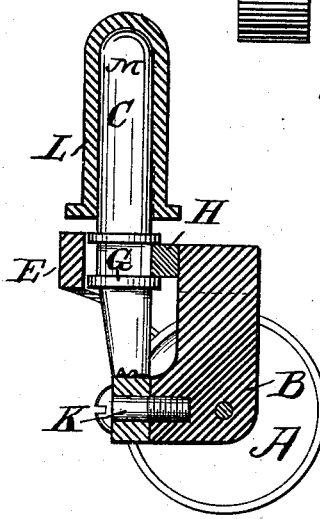
Figure 4:
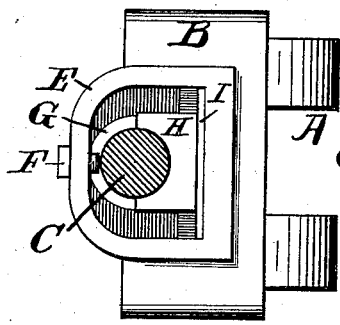
Figure 5:
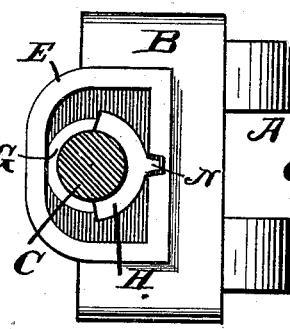
Figure 6:
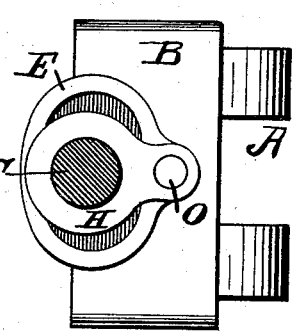

In the accompanying drawings, Figure 1 is a side view, Fig. 2 a rear view, Fig. 3 a vertical section, and Fig. 4 a plan, of a caster embodying my improvements. Figs. 5 and 6 are plans showing modifications. Fig. 7 is a vertical section, showing a modification.

The drawings exhibit double or two-wheeled casters; but I contemplate the embodying of my improvements in one-wheeled casters, if found desirable.

A represents the floor-wheels; B, the housing of the floor-wheels; C, the stem or spindle; D, the flange to attach to furniture; E, a portion of the housing engaging with the stem; F, a screw or pin seating in portion E, and protruding over a collar, G, on the stem; H, a moving box, preferably of lignum-vitæ or other suitable wood, bearing on the stem and abutting against the metal of the housing; I, a sheet-metal lining for that portion of the housing in which the box H slides; J, the lower end of stem, bearing in bottom of portion E of the housing.

The box H is retained in vertical position by its bearing on the housing, by collar G on the stem, and by plate or flange D, if such plate be used. If no flange D is used for attaching the caster, a collar may be provided above the box, as shown in Fig. 7. The brass lining is not essential; but it forms a smooth surface on which the box H may slide, and avoids the expense of smoothing a track or slide-bearing in the housing. It is retained in place, if loose, by the box H. It may be cast or otherwise fixed in place. The screw or pin F serves to unite the stem and housing. The housing may swivel, as usual, upon the stem, and the box H permits the housing to oscillate upon the stem, as usual, with two-wheeled casters, the axis of oscillation being at J, the same as in a caster patented by me October 10, 1882, the patent being numbered 265,642.

Casters with oscillating housings having a top engagement with the stem have generally heretofore been provided with some arrangement of anti-friction roller. I find the moving box all that can be desired, and cheaper than rollers.

The moving box H, instead of being fitted to slide, as shown in Figs. 3, 4, and 7, may be fitted to roll, as shown in Fig. 5, or to oscillate on a pivot, as shown in Fig. 5. In Fig. 5 the rear face of the box is concentric with the spindle and rolls on the inner face of the housing. It is prevented from shifting by the tooth N engaging a notch in the housing. In Fig. 6 the box oscillates on pivot O in the housing. This arrangement gives a slightly arcal motion to the housing, which does no harm. In Fig. 6 the box H completely encircles the stem, which is not essential, but which feature may be adopted with either a sliding, rolling, or oscillating box, if the construction otherwise renders it desirable. While I prefer wood as the material for the movable box H, I do not confine myself to it.

In the first three figures of the drawings the housing oscillates on the stem, and also swivels upon it. In Fig. 7, I show a construction in which the housing oscillates upon a screw, K, which unites it to the stem; but the housing does not swivel upon the stem, the stem being swiveled above in a socket, L, which is to be attached to furniture. In this case the box H moves as in the other cases; but the stem does not revolve in the box.

This specification sets forth the best manner in which I contemplate applying the principle of my invention.

I claim as my invention—

1. In a swiveling and oscillating caster, the combination, with the stem and housing, of a box engaging the stem and abutting movably upon the housing, substantially as set forth.

2. In a swiveling and oscillating caster, the combination, with the stem and housing, of a box engaging the stem and abutting movably upon the housing, and a sheet-metal lining interposed between the box and housing, substantially as set forth.

3. In a swiveling and oscillating caster, the combination, with the stem and housing, of a box engaging the stem and abutting upon the housing, and a horizontal screw engaging and uniting the stem and housing, substantially as set forth.

CHARLES STENGEL.

Witnesses:
J. W. SEE,
JOHN LORENZ.